(12) United States Patent
Sasaki et al.

(10) Patent No.: US 6,883,092 B2
(45) Date of Patent: Apr. 19, 2005

(54) PROCESSOR AND METHOD OF BOOTING SAME

(75) Inventors: Takeo Sasaki, Kawasaki (JP); Koichi Kuroiwa, Kawasaki (JP); Shoji Taniguchi, Kawasaki (JP); Takanobu Kashiwagi, Hyogo (JP)

(73) Assignee: Fujitsu Limited, Kawasaki (JP)

( * ) Notice: Subject to any disclaimer, the term of this patent is extended or adjusted under 35 U.S.C. 154(b) by 516 days.

(21) Appl. No.: 10/157,992

(22) Filed: May 31, 2002

(65) Prior Publication Data

US 2003/0120912 A1 Jun. 26, 2003

(30) Foreign Application Priority Data

Dec. 26, 2001 (JP) ........................................ 2001-394157

(51) Int. Cl.[7] .............................................. G06F 11/00
(52) U.S. Cl. ...................... 713/2; 713/1; 714/5; 714/38
(58) Field of Search ............................ 713/1, 2; 714/5, 714/38

(56) References Cited

U.S. PATENT DOCUMENTS

| | | | | |
|---|---|---|---|---|
| 5,269,022 A | * | 12/1993 | Shinjo et al. .................. | 713/2 |
| 5,388,267 A | * | 2/1995 | Chan et al. ..................... | 713/2 |
| 6,012,142 A | * | 1/2000 | Dokic et al. .................... | 713/2 |
| 6,061,788 A | * | 5/2000 | Reynaud et al. ................ | 713/2 |
| 6,360,362 B1 | * | 3/2002 | Fichtner et al. ............. | 717/168 |
| 6,473,856 B1 | * | 10/2002 | Goodwin et al. .............. | 713/2 |
| 6,591,376 B1 | * | 7/2003 | VanRooven et al. .......... | 714/36 |
| 6,625,809 B1 | * | 9/2003 | Duff ........................... | 717/169 |
| 6,651,188 B1 | * | 11/2003 | Harding et al. ................ | 714/38 |
| 6,681,323 B1 | * | 1/2004 | Fontanesi et al. .............. | 713/1 |
| 6,757,838 B1 | * | 6/2004 | Chaiken et al. ................ | 714/5 |
| 6,788,604 B1 | * | 9/2004 | Yokota et al. .............. | 365/218 |

OTHER PUBLICATIONS

Japanese Patent Abstract No. 09282241 date Oct. 31, 1997.
Japanese Patent Abstract No. 2000-305859, dated Nov. 2, 2000.

* cited by examiner

*Primary Examiner*—A. Elamin
(74) *Attorney, Agent, or Firm*—Staas & Halsey LLP (57) ABSTRACT

A processor and method of booting the processor in which dispensable circuit operation is eliminated to reduce power consumption. A first expected check-sum value relating to instructions and table data and a second expected check-sum value relating only to instructions are held in a boot ROM. When power is turned on, if a power-on determination circuit determines that the power has been turned on for a system, a read selection circuit loads instructions and the table data into an instruction storage memory and a table data storage memory and a check-sum performing circuit performs check-sum using the first expected check-sum value. In the case where the power has been turned on for periodic operation, instructions are loaded into the instruction storage memory, check-sum is performed using the second expected check-sum value, and table data that was saved in a backup memory is loaded into the table data storage memory. Thus, the time required for loading from the boot ROM for the periodic operation decreases.

6 Claims, 7 Drawing Sheets

PROCESSOR AND METHOD OF BOOTING SAME

BACKGROUND OF THE INVENTION (1) Field of the Invention

The present invention relates to a processor and a method of booting it, especially a processor in a baseband LSI (Large-Scale Integration) for a mobile communication system, especially for W-CDMA (Wideband Code Division Multiple Access) system and a method of booting it.

In recent years, in a baseband LSI for W-CDMA used in a portable device for a mobile communication system, during periodic receive operation which is performed in a standby state, i.e., except when the portable device is being used, to check call, a block that is needed for call is powered on and the rest is powered off, in order to reduce battery power consumption and thereby make the maximum duration of a continuous call and the maximum standby duration longer.

(2) Description of the Related Art

Figure 7:
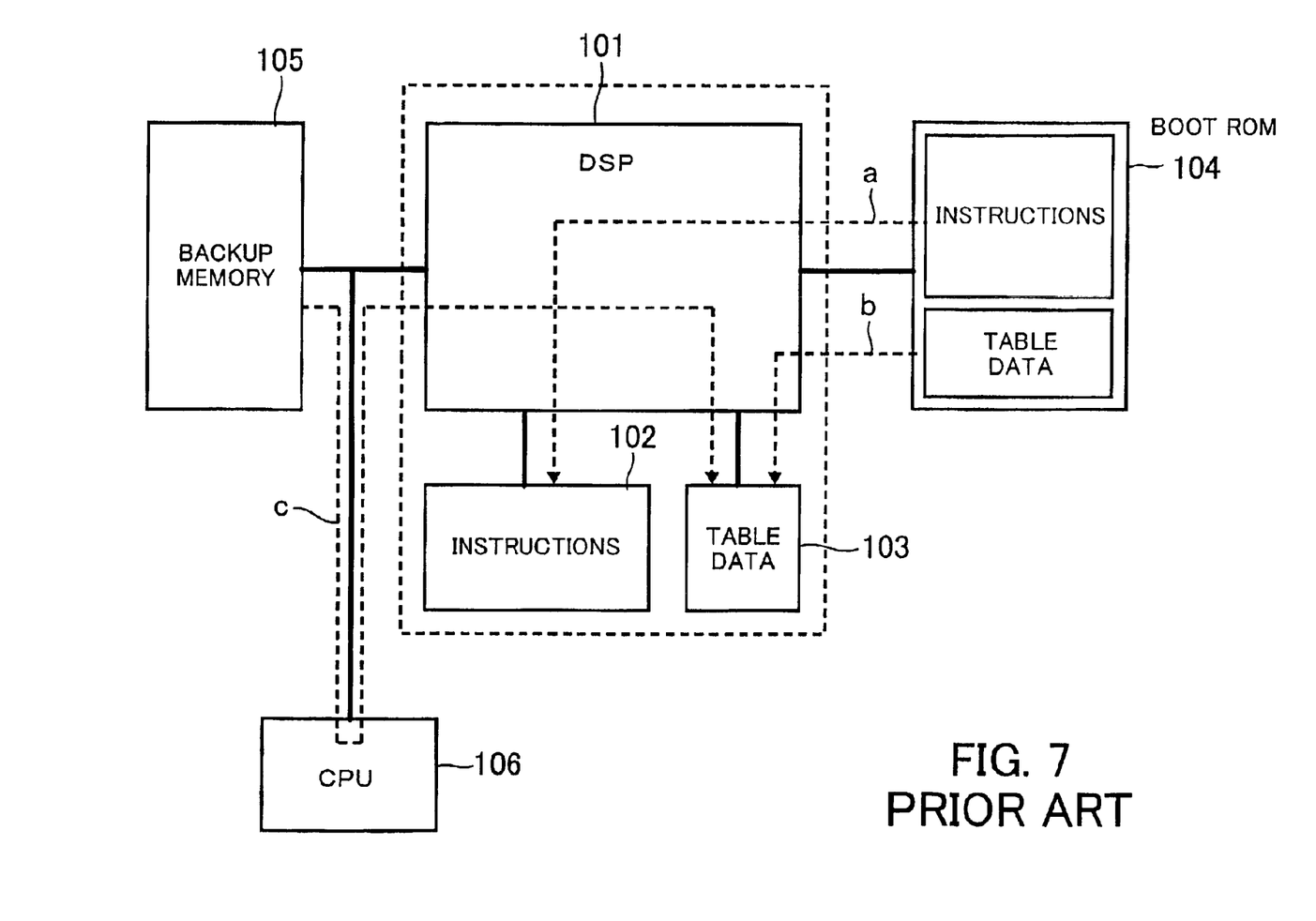
FIG. 7 is a diagram for explaining a method of booting a conventional processor.

FIG. 7 is a diagram showing a method of booting a conventional processor.

In FIG. 7, a DSP (Digital Signal Processor) 101 is, for example, in the case of a baseband LSI for W-CDMA, a processor that controls a modem section for modulating and demodulating a signal such as a sound wave and a codec section for performing scrambling and error correction. The DSP 101 is included in a block that is powered on during periodic receive operation in a standby state and powered off during the rest of time. To the DSP 101 are connected an instruction memory 102 for storing instructions and a table data memory 103 for storing table data. Also a boot ROM 104 for storing instructions of programs and table data of initial values, a backup memory 105 for storing table data when periodic receive operation ends, and a CPU (Central Processing Unit) 106 for controlling transfer of table data into the backup memory 105 are connected to the DSP 101. The backup memory 105 and the CPU 106 are included in a block that is not powered off while a system incorporating the DSP 101 is being used.

Here, when power is turned on initially, the DSP 101 first reads instructions from the boot ROM 104 and writes them into the instruction memory 102 (path a). Next, the DSP 101 reads table data from the boot ROM 104 and writes it into the table data memory 103 (path b). After finishing the writing, the DSP 101 calculates a sum of data that forms the instructions and the table data and checks that the calculated sum agrees with an expected value that has been read together (This operation will be hereinafter referred to "check-sum"). The fact that the calculated sum agrees with the expected value proves that the DSP 101 has read data from the boot ROM 104 correctly. Then, the DSP 101 performs periodic receive operation using programs in the instruction memory 102 and the table data (initial values) in the table data memory 103.

When periodic receive operation is to be performed, a block including the DSP 101, the instruction memory 102 and the table data memory 103 is powered on. With this, the DSP 101 first reads instructions from the boot ROM 104 and writes them into the instruction memory 102 (path a) and reads table data from the boot ROM 104 and writes it into the table data memory 103 (path b). After finishing the writing, the DSP 101 performs check-sum. Next, table data that was saved in the backup memory 105 when power was turned off last is read through the CPU 106 and written into the table data memory 103 (path c). At this time, the table data in the table data memory 103, which was read from the boot ROM 104, is replaced with the table data in the backup memory 105. Then, the DSP 101 performs periodic receive operation using programs in the instruction memory 102 and the table data in the table data memory 103.

This method of booting the conventional processor has however a problem. Specifically, in this method, when power is turned on for periodic operation as well as when power is turned on initially, both programs and table data are read from the boot ROM in boot process. However, when power is turned on for periodic operation, table data having initial values is replaced with backed-up table data. Therefore, it is not necessary to read the table data having initial values. Dispensable circuit operation increases power consumption and makes battery duration correspondingly shorter.

SUMMARY OF THE INVENTION

The present invention has been made in view of the problem as above. An object of the present invention is to provide a processor and a method of booting the processor in which power consumption is reduced by eliminating dispensable circuit operation.

In order to attain the above object, there is provided a processor arranged to be periodically powered on and off to perform periodic operation. The processor comprises a power-on determination circuit for determining, when power is turned on, whether the power has been turned on for a system that incorporates the processor or for the periodic operation; a read selection circuit for performing control depending on a result of determination by the power-on determination circuit so that in the case where the power has been turned on for the system, instructions, table data and a first expected check-sum value will be read from a boot ROM and written into an instruction storage memory and a table data storage memory, and in the case where power has been turned on for the periodic operation, instructions and a second expected check-sum value will be read from the boot ROM and written into the instruction storage memory, and table data that was backed up when the power was turned off last will be read from a backup memory and written into the table data storage memory; and a check-sum performing circuit arranged to, in the case where the power has been turned on for the system, calculate a check-sum about the data that has been written into the instruction storage memory and the table data storage memory and check the calculated check-sum with the first expected check-sum value, and in the case where the power has been turned on for the periodic operation, calculate a check-sum about the data that has been written into the instruction storage memory and check the calculated check-sum with the second expected check-sum value.

Further, in order to attain the above object, there is provided a method of booting a processor arranged to be periodically powered on and off to perform periodic operation. In this method, when power is turned on, it is determined whether the power has been turned on for a system that incorporates the processor or for the periodic operation; in the case where the power has been turned on for the system, instructions, table data and a first expected check-sum value are read from a boot ROM, and in the case where the power has been turned on for the periodic operation, instructions and a second expected check-sum value are read from the boot ROM and table data that was backed up when the power was turned off last is read; and in the case where the power has been turned on for the system, a check-sum about the data that has been read is calculated and the calculated check-sum is checked with the first expected check-sum value, and in the case where the power has been turned on for the periodic operation, a check-sum about the data that has been read from the boot ROM is calculated and the calculated check-sum is checked with the second expected check-sum value.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

First, with reference to the drawings, the outline of the present invention will be described.

Figure 1:
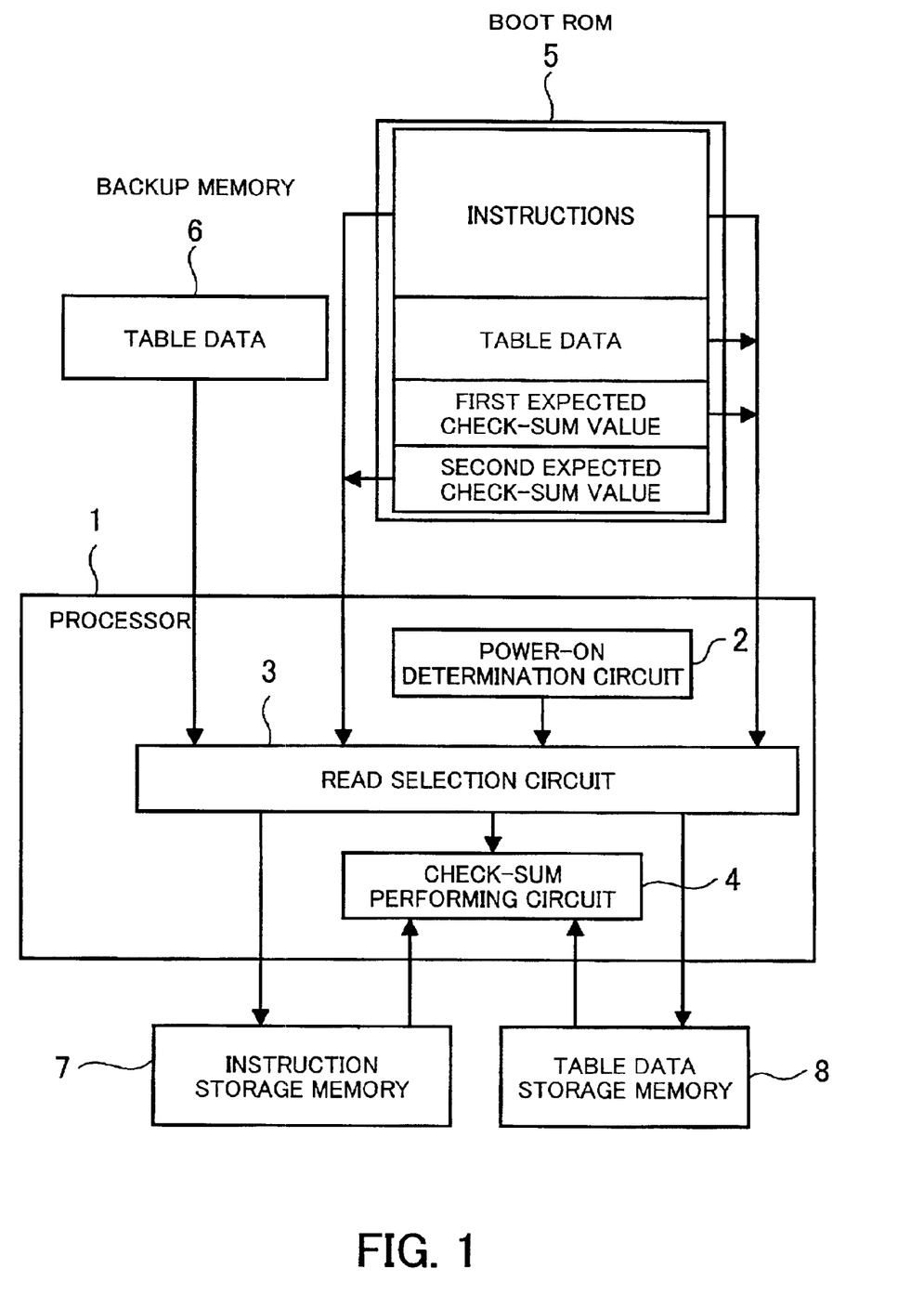
FIG. 1 is a diagram showing a basic structure of a processor according to the present invention.

FIG. 1 is a diagram showing a basic structure of a processor according to the present invention.

The processor 1 according to the present invention has a power-on determination circuit 2, a read selection circuit 3, and a check-sum performing circuit 4. The power-on determination circuit 2 has function for determining whether power has been turned on for a system that incorporates the processor 1 or for periodic operation. The read selection circuit 3 has function for selecting data to be loaded in boot process, depending on a result of determination by the power-on determination circuit 2. Specifically, the read selection circuit 3 performs control so that in the case where power has been turned on for the system, instructions, table data and a first expected check-sum value will be read from a boot ROM 5, and in the case where power has been turned on for the periodic operation, instructions and a second expected check-sum value will be read from the boot ROM 5 and table data that was backed up into a backup memory 6 will be read. The check-sum performing circuit 4 has function for, in the case where power has been turned on for the system, performing check-sum using the instructions, table data and first expected check-sum value that have been read, and in the case where power has been turned on for the periodic operation, performing check-sum using the instructions and second expected check-sum value that have been read.

Next, with reference to FIG. 2, a method of booting the processor will be described.

Figure 2:
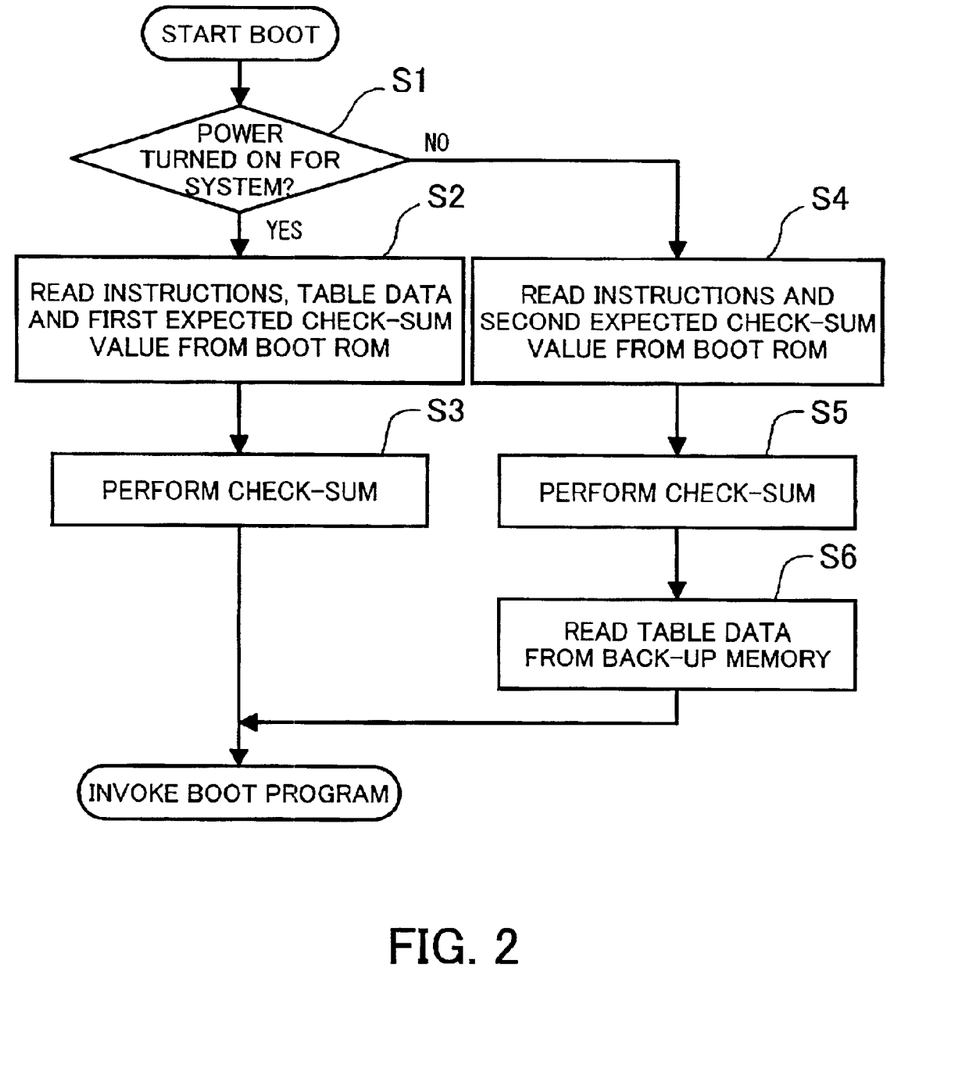
FIG. 2 is a flow chart showing the process of booting the processor.

FIG. 2 is a flow chart showing the process of booting the processor.

First, when power is turned on, the power-on determination circuit 2 determines whether the power has been turned on for the system or not (step S1). If the power has been turned on for the system, the read selection circuit 3 reads instructions, table data and the first expected check-sum value from the boot ROM 5 and writes the instructions into an instruction storage memory 7 and the table data into a table data storage memory 8 (step S2). After the writing is finished, the check-sum performing circuit 4 calculates a sum about the instructions written in the instruction storage memory 7 and the table data written in the table data storage memory 8, and checks the calculated sum with the first expected check-sum value (step S3). Then, a boot program that is formed of instructions written in the instruction storage memory 7 is invoked.

If, in step S1, the power-on determination circuit 2 determines that the power has been turned on for the periodic operation, the read selection circuit 3 reads instructions and the second expected check-sum value from the boot ROM 5, and writes the instructions into the instruction storage memory 7 (step S4). Then, the check-sum performing circuit 4 performs check-sum using the instructions written in the instruction storage memory 7 and the second expected check-sum value (step S5). Here, since the read selection circuit 3 does not read table data from the boot ROM 5, the time required for reading from the boot ROM 5 decreases. This leads to decrease in the time required for the periodic operation, during which the processor is powered on. Next, the read selection circuit 3 reads table data that was saved when the periodic operation ended last, from the backup memory 6 and writes it into the table data storage memory 8 (step S6). Then, the boot program that is formed of instructions written in the instruction storage memory 7 is invoked.

Next, an embodiment of the present invention will be described, in which the present invention is applied to a DSP incorporated in a baseband LSI for W-CDM.

Figure 3:
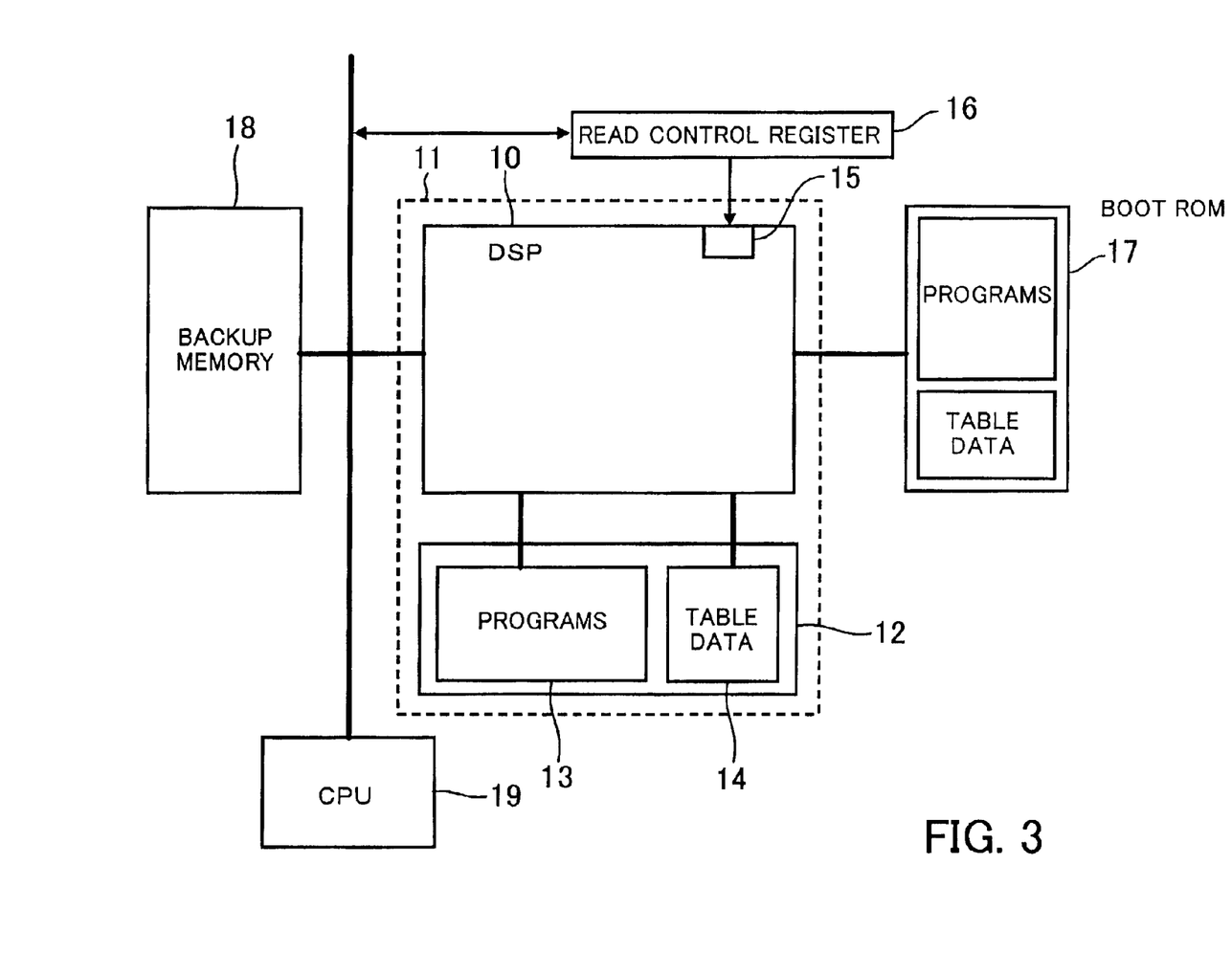
FIG. 3 is a diagram showing a structure of principal parts around a DSP.
Figure 4:
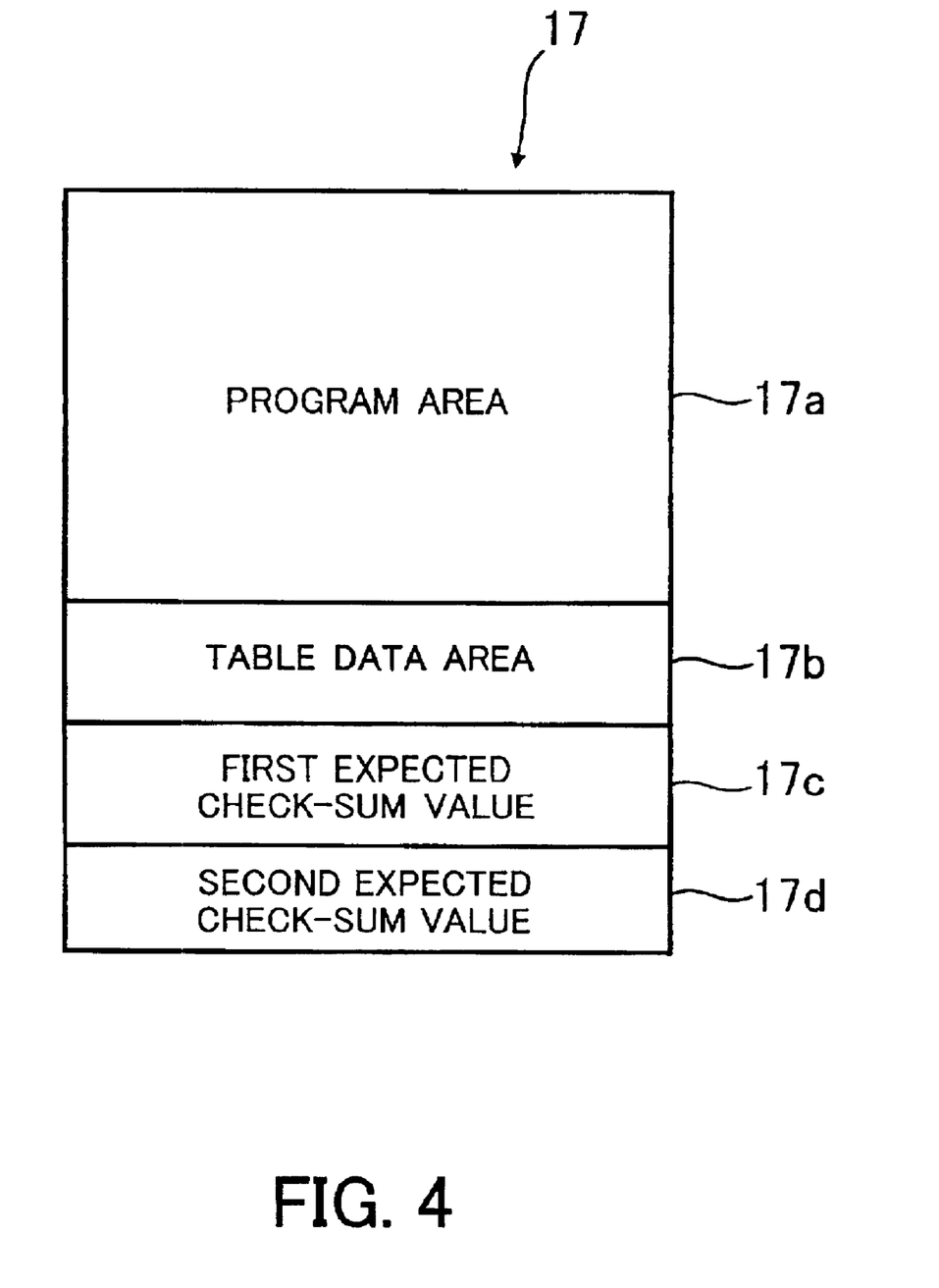
FIG. 4 is a diagram showing details of a boot ROM.

FIG. 3 is a diagram showing a structure of principal parts around a DSP, and FIG. 4 is a diagram showing details of a boot ROM.

In the baseband LSI for W-CDMA, the DSP 10 is provided in a block 11 that is powered on during periodic receive operation in a standby state and powered off during the rest of time, i.e., while the periodic receive operation is not being performed. The block 11 includes a memory 12. The memory 12 has a program area 13 and a table data area 14. The DSP 10 has a read control port 15 that is part of a power-on determination circuit. The read control port 15 is connected to a read control register 16. The read control register 16 is provided in a block that is not powered off even while the DSP 10 is not performing the periodic receive operation. For example, the read control register 16 transmits the value "0" of a control flag to the read control port 15 when power is turned on for the system, and transmits the value "1" of the control flag to the read control port 15 after the system performs operation.

The DSP 10 is connected to a boot ROM 17 that stores data to be read in boot process. As specifically shown in FIG. 4, the boot ROM 17 has a program area 17a, a table data area 17b, a first expected check-sum value area 17c, and a second expected check-sum value area 17d. In the first expected check-sum value area 17c is stored a first expected check-sum value which is made from data that forms programs stored in the program area 17a and table data stored in the table data area 17b. In the second expected check-sum value area 17d is stored a second expected check-sum value which is made from data that forms programs stored in the program area 17a. Actually, the first and second expected check-sum values are held in a check-sum program that is among the programs stored in the program area 17a.

The DSP 10 is also connected to a backup memory 18 for storing table data that is held in the table data area 14 when the periodic receive operation ends, and a CPU that controls transfer of table data to the backup memory 18. Also the backup memory 18 and the CPU 19 are provided in the block that is not powered off even while the DSP 10 is not performing the periodic receive operation.

Figure 5:
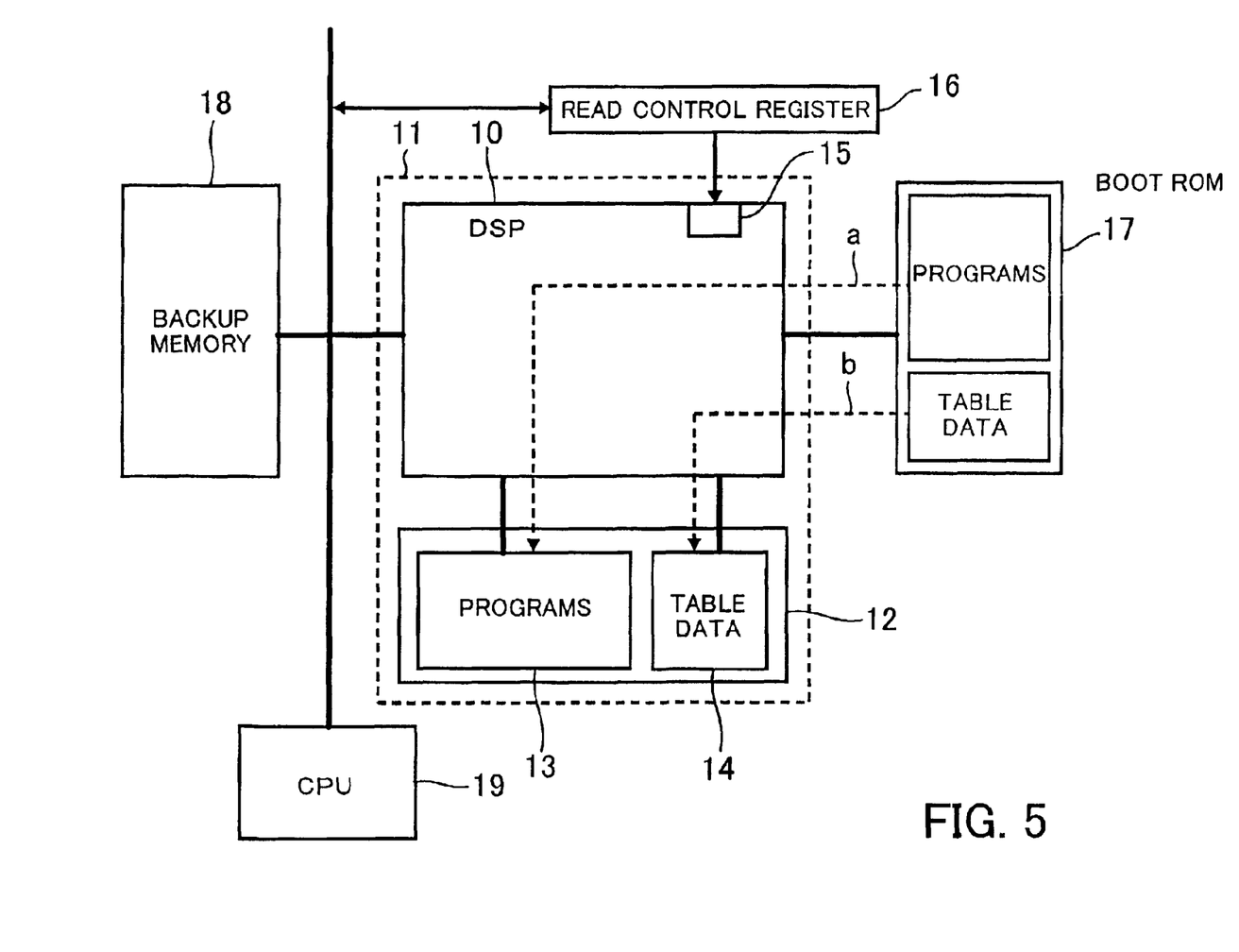
FIG. 5 is a diagram for explaining how the DSP is booted when power is turned on for a system.

FIG. 5 is a diagram for explaining how the DSP is booted when power is turned on for the system.

When power is turned on for the system, the read control register 16 reads the value "0" of the control flag and transmits it to the read control port 15. Therefore, referring to the value that has been transmitted to the read control port 15, the DSP 10 determines that the power has been turned on for the system. Next, the DSP 10 reads programs from the program area 17a of the boot ROM 17 and writes them into the program area 13 of the memory 12 (path a). Then, the DSP 10 reads the table data from the table data area 17b of the boot ROM 17 and writes it into the table data area 14 of the memory 12 (path b). Then, the DSP 10 invokes the check-sum program that is among the programs that have been read, calculates a check-sum about the data that has been written into the memory 12, and checks the calculated check-sum with the first expected check-sum value held in the check-sum program.

Figure 6:
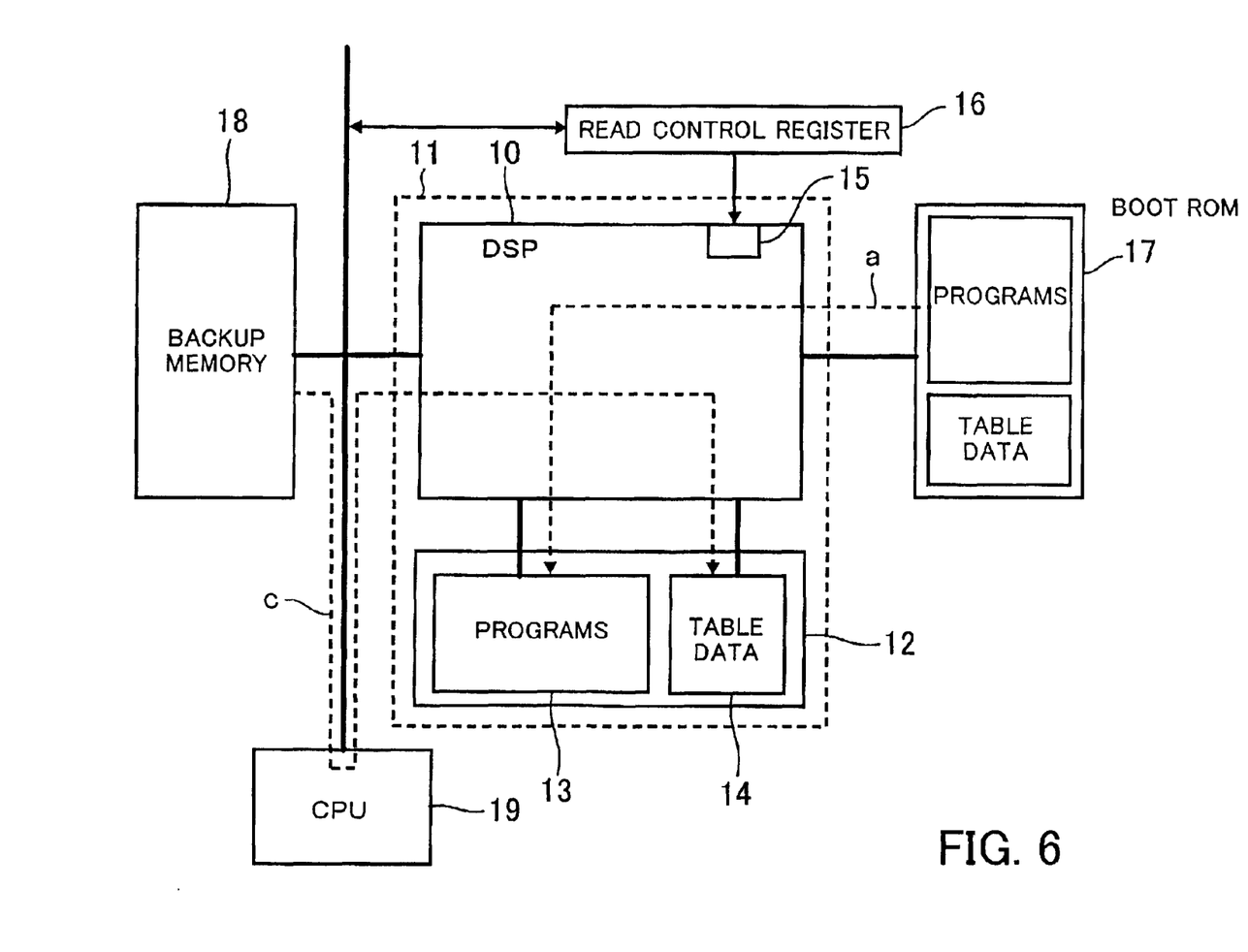
FIG. 6 is a diagram for explaining how the DSP is booted when power is turned on for periodic receive.

FIG. 6 is a diagram for explaining how the DSP is booted when power is turned on for the periodic receive.

After the system performs operation, the read control register 16 transmits the value "1" of the control flag to the read control port 15. Therefore, when the DSP 10 is powered on for the periodic receive operation, the DSP 10 refers to the value that has been transmitted to the read control port 15 and determines that the power has been turned on for the periodic receive operation. Next, the DSP 10 reads programs from the program area 17a of the boot ROM 17 and writes them into the program area 13 of the memory 12 (path a). Then, the DSP 10 invokes the check-sum program that is among the programs that have been read, and performs check-sum on data that forms the programs which have been written into the memory 12, using the second expected check-sum value. Next, the DSP 10 reads table data that was saved in the backup memory 18 when power was turned off last, through the CPU 19, and writes it into the table data area 14 of the memory 12 (path c). Here, since table data is not read from the boot ROM 17, the time for it is saved. This leads to decrease in the time required for the periodic operation.

As described above, in the present invention, two expected check-sum values, i.e., a first expected check-sum value that is a check-sum about instructions and table data, and a second expected check-sum value that is a check-sum about instructions are provided. When the system is booted, instructions and table data are loaded, and check-sum is performed using the first expected check-sum value. When power is turned on for periodic operation, only instructions are loaded and check-sum is performed using the second expected check-sum value. Thus, when power is turned on for periodic operation, loading of table data having initial values is omitted. Therefore, the time required for loading decreases. This leads to decrease in the time required for periodic operation, and therefore, decrease in the processor's power consumption.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A processor arranged to be periodically powered on and off to perform periodic operation, comprising
a power-on determination circuit for determining, when power is turned on, whether the power has been turned on for a system that incorporates the processor or for the periodic operation,
a read selection circuit for performing control depending on a result of determination by the power-on determination circuit so that in the case where the power has been turned on for the system, instructions, table data and a first expected check-sum value will be read from a boot ROM and written into an instruction storage memory and a table data storage memory, and in the case where the power has been turned on for the periodic operation, instructions and a second expected check-sum value will be read from the boot ROM and written into the instruction storage memory, and table data that was backed up when the power was turned off last will be read from a backup memory and written into the table data storage memory, and
a check-sum performing circuit arranged to, in the case where the power has been turned on for the system, calculate a check-sum about the data that has been written into the instruction storage memory and the table data storage memory and check the calculated check-sum with the first expected check-sum value, and in the case where the power has been turned on for the periodic operation, calculate a check-sum about the data that has been written into the instruction storage memory and check the calculated check-sum with the second expected check-sum value.

2. The processor according to claim 1, wherein the processor has a control port for receiving information about what the power has been turned on for, from an external read control circuit that operates depending on power-on and -off of the system, and the power-on determination circuit makes determination depending on the information received by the control port.

3. The processor according to claim 1, wherein the processor is a digital signal processor in a baseband LSI for W-CDMA, and arranged to be powered on to perform periodic receive operation in a standby state and powered off after finishing the periodic receive operation.

4. A method of booting a processor arranged to be periodically powered on and off to perform periodic operation, wherein
when power is turned on, it is determined whether the power has been turned on for a system that incorporates the processor or for the periodic operation,
in the case where the power has been turned on for the system, instructions, table data and a first expected check-sum value are read from a boot ROM, and in the case where the power has been turned on for the periodic operation, instructions and a second expected check-sum value are read from the boot ROM and table data that was backed up when the power was turned off last is read, and in the case where the power has been turned on for the system, a check-sum about the data that has been read is calculated and the calculated check-sum is checked with the first expected check-sum value, and in the case where the power has been turned on for the periodic operation, a check-sum about the data that has been read from the boot ROM is calculated and the calculated check-sum is checked with the second expected check-sum value.

5. The method of booting the processor according to claim 4, wherein whether the power has been turned on for the system or for the periodic operation is determined on the basis of information from an external read control circuit that is arranged not to be powered off even while the periodic operation is not being performed.

6. A semiconductor device having a first block arranged not to be powered off and a second block arranged to be powered on and off while the first block is powered on, comprising     a boot ROM for storing programs that are to be read in boot process, table data of initial values, a first expected check-sum value that is a sum of data that forms the programs and the table data and is regarded as numeric values, and a second expected check-sum value that is a sum of data that forms the programs and is regarded as numeric values, a backup memory for saving table data that was processed before the second block was powered off last, a power-on determination circuit for determining whether the first block or the second block has been powered on, a read selection circuit for performing control so that programs, the table data and the first expected check-sum value will be read from the boot ROM, or programs and the second expected check-sum value will be read from the boot ROM and table data that was backed up when the power was turned off last will be read from the backup memory, depending on a result of determination by the power-on determination circuit, a first storage memory for storing the programs read by the read selection circuit, a second storage memory for storing the table data read by the read selection circuit, and a check-sum performing circuit for performing check-sum on the programs stored in the first storage memory and the table data stored in the second storage memory using the first expected check-sum value, or performing check-sum on the programs stored in the first storage memory using the second expected check-sum value.

* * * * *